(12) United States Patent
Black et al.

(10) Patent No.: US 9,019,066 B2
(45) Date of Patent: Apr. 28, 2015

(54) TERMINAL

(75) Inventors: Jonathan S. Black, Dundee (GB); Michael R. McNamara, Edinburgh (GB)

(73) Assignee: NCR Corporation, Duluth, GA (US)

(*) Notice: Subject to any disclaimer, the term of this patent is extended or adjusted under 35 U.S.C. 154(b) by 1646 days.

(21) Appl. No.: 11/888,681

(22) Filed: Aug. 2, 2007

(65) Prior Publication Data

US 2009/0033489 A1     Feb. 5, 2009

(51) Int. Cl.
- G05B 23/02 (2006.01)
- G07F 19/00 (2006.01)
- G06Q 20/40 (2012.01)

(52) U.S. Cl.
CPC ........ G07F 19/207 (2013.01); G06Q 20/40145 (2013.01); G07F 19/20 (2013.01)

(58) Field of Classification Search
USPC .............. 340/3.1, 286.06, 540; 235/379, 380, 235/381, 383; 705/16, 35, 42, 43
See application file for complete search history.

(56) References Cited

U.S. PATENT DOCUMENTS

| | | | | |
|---|---|---|---|---|
| 5,661,283 A * | 8/1997 | Gallacher et al. | ............. | 235/379 |
| 6,314,407 B1 * | 11/2001 | Maeno | ............................ | 705/16 |
| 6,968,321 B1 * | 11/2005 | Yu | .................................... | 705/43 |
| 7,082,430 B1 * | 7/2006 | Danielsen et al. | ..................... | 1/1 |
| 7,533,805 B1 * | 5/2009 | Enright et al. | ................ | 235/379 |
| 7,658,327 B2 * | 2/2010 | Tuchman et al. | ............. | 235/381 |
| 7,748,618 B2 * | 7/2010 | Vawter | ........................... | 235/380 |
| 7,780,081 B1 * | 8/2010 | Liang | ............................. | 235/383 |
| 7,823,772 B2 * | 11/2010 | Vawter | ........................... | 235/380 |
| 7,965,194 B2 * | 6/2011 | Martini | ........................ | 340/657 |
| 2002/0032655 A1 * | 3/2002 | Antonin et al. | .................. | 705/43 |
| 2002/0138431 A1 * | 9/2002 | Antonin et al. | .................. | 705/42 |
| 2005/0102704 A1 * | 5/2005 | Prokupets et al. | ............ | 725/118 |
| 2006/0032915 A1 * | 2/2006 | Schwartz | ...................... | 235/383 |
| 2006/0097172 A1 * | 5/2006 | Park | .......................... | 250/338.1 |
| 2006/0202012 A1 * | 9/2006 | Grano et al. | .................. | 235/379 |
| 2006/0268341 A1 * | 11/2006 | Weig | ............................ | 358/1.18 |
| 2007/0024580 A1 * | 2/2007 | Sands et al. | .................... | 345/156 |
| 2007/0027806 A1 * | 2/2007 | Sands et al. | ...................... | 705/42 |
| 2007/0095354 A1 * | 5/2007 | Churchill et al. | ............. | 128/897 |
| 2007/0127787 A1 * | 6/2007 | Castleman et al. | ........... | 382/118 |
| 2007/0138268 A1 * | 6/2007 | Tuchman | ...................... | 235/383 |
| 2007/0265948 A1 * | 11/2007 | Maiorino et al. | ............... | 705/35 |
| 2007/0282951 A1 * | 12/2007 | Selimis et al. | ................ | 709/205 |
| 2008/0035724 A1 * | 2/2008 | Vawter | ........................... | 235/380 |

(Continued)

FOREIGN PATENT DOCUMENTS

| | | | | |
|---|---|---|---|---|
| EP | 661677 A2 * | 7/1995 | ................ | G07F 7/10 |
| JP | 02114372 A * | 4/1990 | .............. | G06F 15/30 |

(Continued)

*Primary Examiner* — Paul Obiniyi
(74) *Attorney, Agent, or Firm* — Peter H. Priest; Joseph P. Mehrle

(57) ABSTRACT

A terminal, such as an automated teller machine, comprises: a customer identification device; a sensor for detecting presence of a customer at the terminal; and a controller coupled to the customer identification device and the sensor. The controller is programmed to (i) track the customer's location, (ii) create a session on identification of a customer, and (iii) close the created session when a customer absence criterion is fulfilled. The functions of the customer identification device and the sensor may be performed by a single unit. The customer absence criterion may comprise a time period during which the customer is not detected at the terminal.

19 Claims, 3 Drawing Sheets

(56) References Cited

U.S. PATENT DOCUMENTS

| | | | |
|---|---|---|---|
| 2008/0041937 A1* | 2/2008 | Vawter | 235/380 |
| 2008/0080739 A1* | 4/2008 | Muramatsu | 382/103 |
| 2009/0033489 A1* | 2/2009 | Black et al. | 340/541 |
| 2009/0231130 A1* | 9/2009 | Martini | 340/540 |
| 2010/0141787 A1* | 6/2010 | Bigioi et al. | 348/222.1 |

FOREIGN PATENT DOCUMENTS

| | | | | |
|---|---|---|---|---|
| JP | 05162795 A | * | 6/1993 | B67D 5/32 |
| JP | 07234958 A | * | 9/1995 | G07D 9/00 |
| JP | 2002063629 A | * | 2/2002 | G07D 9/00 |
| JP | 2006178709 A | * | 7/2006 | |

* cited by examiner

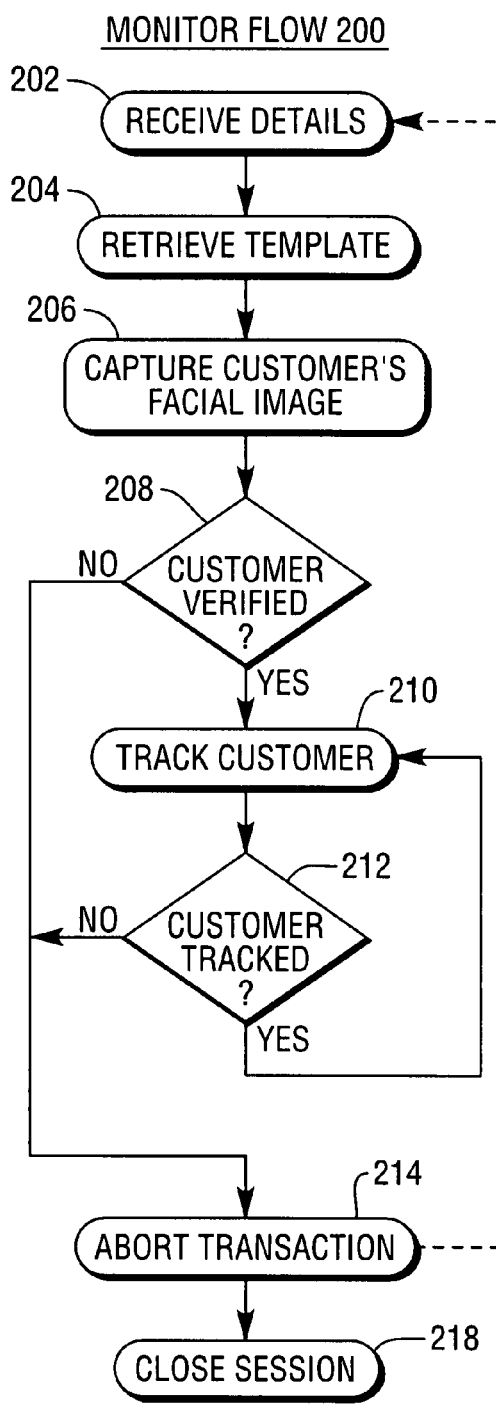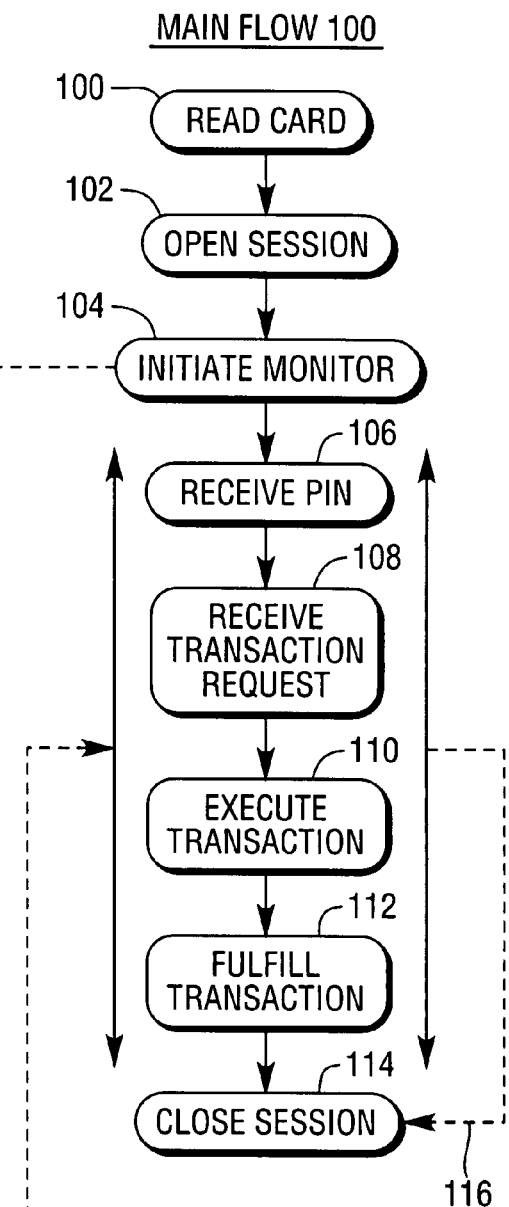
FIG. 3B
FIG. 3A

TERMINAL

BACKGROUND

The present invention relates to a terminal, such as a self-service terminal.

Self-service terminals are public access terminals that allow customers to conduct transactions. One popular type of SST is an automated teller machine (ATM). At an ATM, a customer typically initiates a transaction by inserting an identification card.

It is becoming more common for such ATMs to use dip card readers (where part of the card always protrudes from the reader) rather than motorized card readers (where the card is completely enclosed by the reader) because dip card readers do not require the customer to yield control of the card to the ATM. Dip card readers also have the advantage that the ATM does not need to capture the customer's card if the customer leaves his/her card in the ATM.

One problem with using dip readers is that a customer may initiate a transaction but leave before the transaction is completed. The ATM may not be able to ascertain that the customer has prematurely left the ATM, so the next customer may be able to continue a transaction or a session initiated by the previous customer.

SUMMARY

According to a first aspect of the present invention there is provided a terminal comprising: a customer identification device; a sensor for detecting presence of a customer at the terminal; and a controller coupled to the customer identification device and the sensor, and being programmed to (i) track the customer's location, (ii) create a session on identification of a customer, and (iii) close the created session when a customer absence criterion is fulfilled.

The customer identification device may be a media reader, such as a card reader. The card reader may be a motorized card reader, a dip card reader, a swipe card reader, or the like. The customer identification device may be used in combination with an encrypting keypad to receive a personal identification number (PIN) associated with the customer's card, so that a customer is identified based on entry of a correct PIN for a particular card.

Alternatively, or additionally, the customer identification device may be a biometric sensor, such as a fingerprint sensor, a palm sensor, an iris sensor, a facial recognition sensor, or the like.

The sensor for detecting the presence of a customer at the terminal may be an imaging device such as a camera (CCD, CMOS, or the like), a thermal imager, or the like. Alternatively, or additionally, the sensor may be a weight sensor (or an array of weight sensors) incorporated into a mat on which the customer stands, so that the presence and weight of a customer can be ascertained during a transaction. Any other convenient sensor may be used.

Where an imager is used as the sensor, the controller may create a template associated with the customer by using target acquisition routines that discriminate between a central person and other people in the background, and/or between a person who is closest and other people in the background. Where the imager is a camera, facial tracking software (which is available commercially) may be used to track the customer's face. The template may include details of the customer's size, face, or the like. Commercial software is available that performs facial identification and tracking, such as FaceIt (trademark) software available from Identix Incorporated of Identix Incorporated, 5600 Rowland Road, Minnetonka, Minn. 55343.

In some embodiments, the sensor for detecting the presence of a customer at the terminal may be combined with a customer identification device, so that a single unit is used both to identify a customer and sense the customer's continued presence at the terminal.

The customer absence criterion may comprise a time period during which the customer is not detected at the terminal. Such a time period may be one, two, three, or five seconds, or any other convenient time period. Alternatively, or additionally, the customer absence criterion may comprise a condition where one or more people are detected closer to the terminal than the customer.

The customer absence criterion may comprise a single condition or a series of conditions.

According to a second aspect of the present invention there is provided a method of operating a terminal, the method comprising: creating a session for a customer at the terminal; sensing at least one characteristic of the customer; creating a template for the customer using the sensed characteristic or characteristics to allow the terminal to discriminate between the customer and other people who may be in the vicinity of the terminal; and closing the created session in the event that a customer absence criterion is fulfilled.

According to a third aspect of the present invention there is provided an assisted terminal system comprising a network of assisted terminals coupled to a supervisory terminal, where the supervisory terminal enables an operator to monitor customer activity at the terminals, the method comprising: (a) creating a session for a customer at one of the terminals; (b) entering session monitoring mode for that session, where session monitoring mode includes (i) sensing at least one characteristic of the customer, (ii) creating a template for the customer using the sensed characteristic or characteristics to allow the terminal to discriminate between the customer and other people who may be in the vicinity of the terminal, and (iii) closing the created session in the event that a customer absence criterion is fulfilled; and (c) exiting session monitoring mode in the event that the customer requests via the assisted terminal assistance from an operator of the supervisory terminal.

The method may comprise the further step of (d) authorizing the operator prior to allowing the operator to provide assistance to the customer at the assisted terminal.

The method may comprise the further step of (e) re-entering session monitoring mode after the operator has completed providing assistance to the customer.

By virtue of this aspect of the invention, the session monitoring mode may be disabled when the customer requests a member of staff (the operator of the supervisory terminal) to assist with a transaction. This avoids the terminal closing the session when the customer moves to one side of the terminal (potentially outside the sensing area) to let the operator interact with the terminal.

According to a fourth aspect of the present invention there is provided a terminal comprising: a device for identifying and detecting continued presence of a customer; a controller coupled to the device, and programmed to create a template associated with the customer using data captured by the device, thereby allowing the terminal to identify and track the customer; the controller being operable to create a session on identification of a customer and to close the created session when a customer absence criterion is fulfilled.

The device may be a facial tracking and recognition device that tracks a customer's face during a transaction and identifies the customer based on characteristics of the face.

The terminal may be a self-service terminal.

BRIEF DESCRIPTION OF THE DRAWINGS

These and other aspects of the present invention will be apparent from the following specific description, given by way of example, with reference to the accompanying drawings, in which:

FIGS. 3A and 3B are flowcharts illustrating a main flow and a monitor flow (respectively) of an application executing on the controller of FIG. 2;

DETAILED DESCRIPTION

Figure 1:
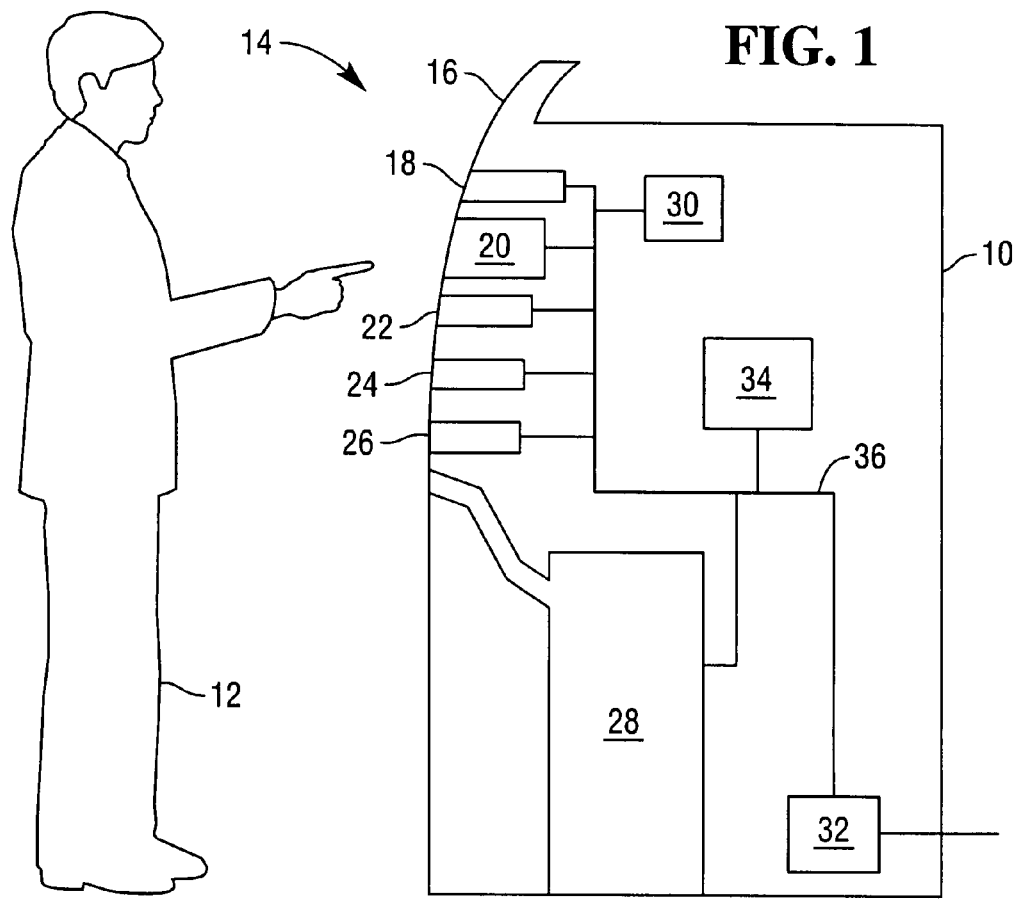
FIG. 1 is a schematic diagram of a self-service terminal according to one embodiment of the present invention.

Reference is now made to FIG. 1, which illustrates an SST 10 in the form of an ATM being operated by a customer 12.

The ATM 10 includes a user interface 14 for receiving input from, and outputting information to, the customer 12.

The user interface 14 comprises: a moulded fascia 16 defining slots (not shown in detail) for accessing devices located within the ATM 10 and in registration with the slots; a sensor 18 in the form of a CCD camera; a display 20 aligned with opposing columns of function defined keys (FDKs); an encrypting keypad 22; a customer identification device 24 in the form of a dip card reader; a printer 26, and a media dispenser 28 in the form of a cash dispenser.

The ATM 10 also includes an internal journal printer 30 for creating a record of all transactions executed by the ATM 10, a network connection 32 (in the form of a network card) for communicating with a remote transaction host (not shown) for authorizing transactions, and an ATM controller 34 for controlling the operation of the various devices (18 to 32). All of the devices (18 to 34) within the ATM 10 are interconnected by an internal bus 36 for securely conveying data.

Figure 2:
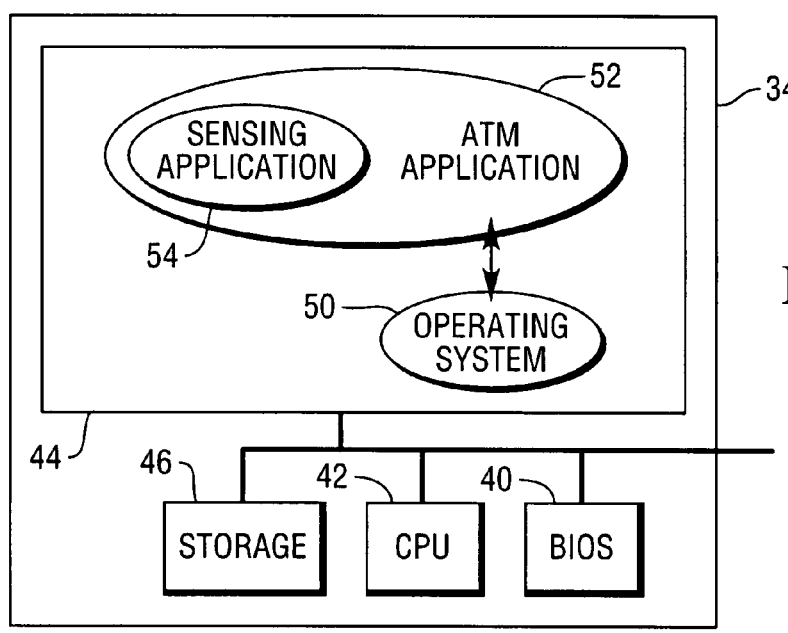
FIG. 2 is a block diagram of a part (the controller) of the terminal of FIG. 1.

The ATM controller 34 is shown in more detail in FIG. 2. The controller 34 comprises a BIOS 40 stored in non-volatile memory, a microprocessor 42, associated main memory 44, and storage space 46 in the form of a magnetic disk drive.

In use, the ATM 10 loads an operating system kernel 50 and an ATM application program 52 into the main memory 44.

The ATM application program 52 includes conventional routines and objects for controlling the operation of the ATM 10, such as providing the sequence of screens used in each transaction (referred to as the application flow) and monitoring the condition of each device within the ATM 10 (state of health monitoring), as is known to those of skill in the art.

In addition to these conventional functions, the ATM application program 52 includes a sensing application 54 associated with the sensor 18 (the CCD camera in this embodiment). The sensing application 54 is based on FaceIt (trademark) software available from Identix Incorporated of 5600 Rowland Road, Minnetonka, Minn. 55343.

The sensing application 54 uses the FaceIt (trademark) software to provide both face finding (it finds a face from an image) and face recognition (it compares a face in an image with a pre-processed facial template, and computes the match score that indicates the likelihood that the two faces correspond to the same person).

The sensing application 54 provides a monitor routine that triggers an exception in the event that the customer 12 leaves the ATM 10 during a transaction. This will be described in more detail with reference to FIGS. 3A and 3B, which are flowcharts illustrating a main flow 100 of the ATM application program 52, and a monitor flow 200 associated with the sensing application 54.

The sensing application 54 executes the monitor flow 200 in parallel with the main flow 100, for example, as a separate thread. For ease of understanding, the main flow 100 will be described first, then the monitor flow 200, although the skilled person will be aware that both flows occur simultaneously.

Main Flow—Transaction

Initially, the ATM 10 displays an attract screen on the ATM display 20 inviting a customer to execute a transaction.

To initiate a transaction, the customer 12 inserts his/her card into the dip reader 24. The ATM 10 responds by reading data from the customer's card (step 100) and opening a session (step 102) for that customer.

The ATM 10 then initiates the sensing application 54 (step 104) by providing the sensing application 54 with unique customer identification information read from the customer's card. This triggers the monitor flow 200, which will be described in more detail below.

The next stage in the transaction is for the ATM 10 to receive a PIN from the customer 12 entered via the encrypting keypad 22 (step 106).

The ATM 10 then invites the customer 12 to select a transaction, and detects the customer's selection (step 108) using either the encrypting keypad 22 or one of the FDKs aligned with the display 20. In this example, the customer 12 selects a cash withdrawal transaction.

The ATM 10 then executes the transaction (step 110) by communicating the transaction request, an encrypted version of the entered PIN, and the account details to a remote authorization host. In the event that the transaction is authorized by the remote host, the ATM 10 fulfils the transaction (step 112) by dispensing the requested amount of cash to the customer 12.

The ATM 10 then closes the session 114 for that customer 12.

Monitor Flow—Customer Tracking

The monitor flow 200, which is initiated by the main flow 100 (in step 104), occurs simultaneously with the main flow 100, and will now be described with reference to FIG. 3B.

The sensing application 54 receives the unique customer identification information transmitted from the main flow 100 (step 202) and uses this information to access a pre-stored template associated with that customer 12 (step 204). The pre-stored template may be stored in the magnetic disk drive 46 and loaded into the memory 44.

In this embodiment, the pre-stored template comprises a fixed amount of data representing essential facial characteristics of a particular customer. The pre-stored template is created during an enrolment process. In the enrolment process, an image of the customer's face is captured and analyzed. An algorithm is used to convert essential characteristics (for example, distances between facial features) of the customer's face into a fixed amount of data.

Once the customer's template has been retrieved, the sensing application 54 then captures an image of the customer 12 using the CCD camera 18 and processes the captured image to locate the customer's face (step 206).

The sensing application 54 then creates a template from the image of the customer's face by employing the algorithm that was used in the enrolment process. This newly created template is compared with the retrieved template for that customer 12 to ascertain if there is a match (step 208).

If there is a match (within permissible tolerances) between the created template and the retrieved template, then the sensing application 54 tracks any movements of the customer's head (step 210). Provided the customer 12 remains in front of the ATM 10, without anyone else entering the field of view, the sensing application 54 continues to track the customer 12 (step 212), and the monitoring flow 200 does not trigger any exceptions.

If there is not a match (within permissible tolerances) between the created template and the retrieved template, or if there is a match but the customer 12 cannot be tracked, then the sensing application 54 triggers an exception that aborts the transaction in the main flow (step 214), which is illustrated by arrow 216, and closes the session for that customer (step 218).

The particular steps taken to abort a transaction may depend on what step the transaction is currently executing. For example, if a transaction has been authorized and the ATM 10 is ready to dispense cash (having counted out the required banknotes), then on receipt of an exception from the monitor flow 200, the ATM application program 52 may retract the cash (for example to a purge bin) and inform the remote host that the cash was not presented to the customer 12 (illustrated by arrow 116).

Figure 4:
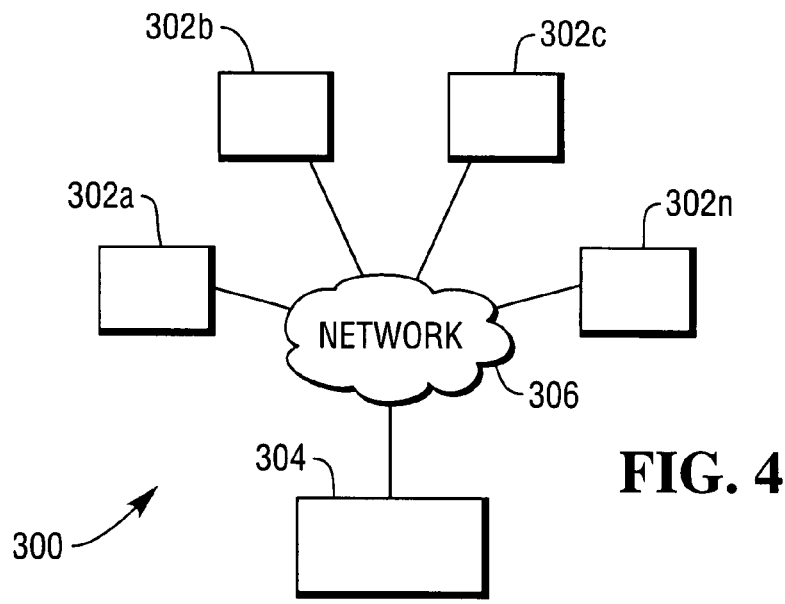
FIG. 4 is a block diagram illustrating a network of assisted terminals according to another embodiment of the present invention.

Reference will now be made to FIG. 4, which illustrates an assisted service system 300 comprising a network of assisted terminals 302a, b, c . . . n coupled to a supervisory terminal 304 by a wired or wireless network 306. The supervisory terminal 304 is operated by a staff member authorized to fulfill transactions. In this embodiment the system 300 is located within a bank branch, and the assisted terminals 302 are provided to enable customers to pre-stage a transaction.

Figure 5:
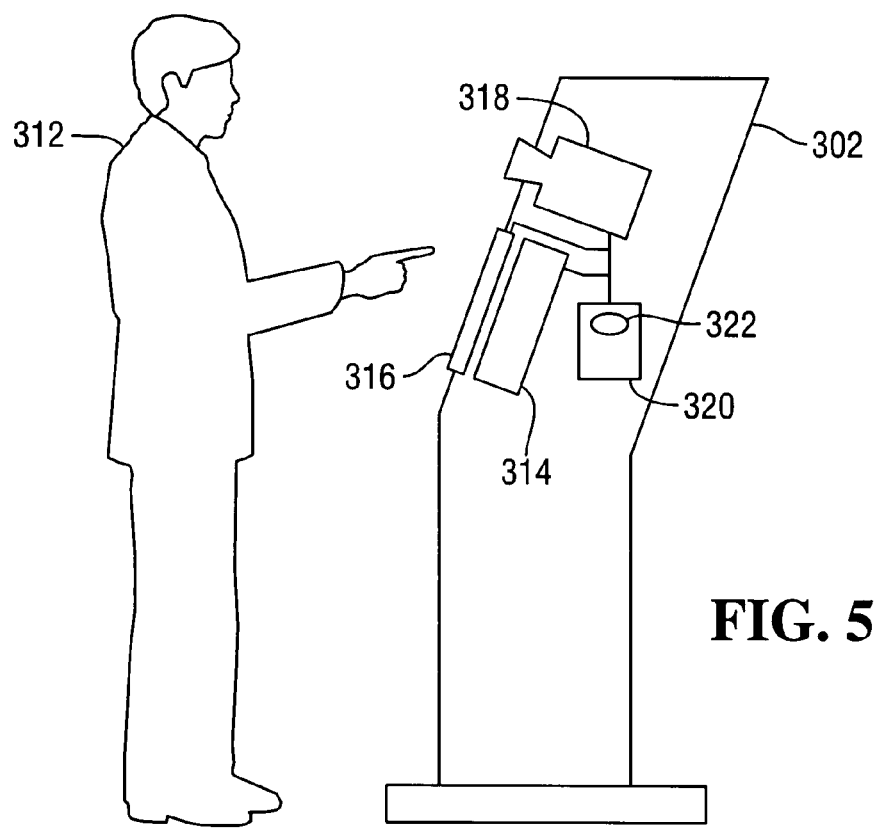
FIG. 5 is a schematic diagram showing one of the terminals of FIG. 4 in more detail.

Reference will also be made to FIG. 5, which shows one of the assisted terminals 302 in more detail. Each terminal 302 comprises a display 314, a touch-sensitive panel 316, a customer identification device 318 in the form of a CCD camera, and a controller 320 executing application software 322 that controls the operation of the terminal 302 and handles communication with the supervisory terminal 304.

On approaching the terminal 302, a customer 312 initiates a transaction by touching an area of the display 314 labeled "Start". This causes the CCD camera 318 to capture an image of the customer. This captured image is then converted to a facial biometric template and compared with a database of pre-stored templates for enrolled customers until a match is found.

Once the customer 312 has been identified (matched to a pre-stored template), the display 314 presents one or more transaction options to the customer and the application software 322 tracks movements of the customer's face in a similar way to that described with reference to FIG. 3. When a transaction has been selected and is ready to be fulfilled, the customer 312 is advised by the terminal 302 to approach a staff member at the supervisory terminal 304 who will fulfill the transaction (for example, by handing over a requested amount of cash). This enables one staff member to fulfill multiple transactions quickly and efficiently.

If the customer 312 leaves the assisted terminal 302 before completing a transaction request, then the application software 322 detects the absence of the customer's face, and after a predetermined time period, for example, three seconds, the application software 322 may abort the transaction and/or notify the supervisory software of the absence of the customer from the assisted terminal 302. This ensures that the next customer cannot use details entered by the customer 312 who left the terminal 302 part-way through a transaction.

If, part-way through a transaction, the customer 312 desires help in preparing and/or entering the transaction, the customer 312 can touch an option labeled "Help" presented on the display 314. In response to the customer 312 requesting help, the controller 320 relays a help request to the supervisory terminal 304 and disables the routines in the application software 322 that track movements of the customer's face (that is, the controller 320 exits session monitoring mode). This is to ensure that the customer's session is not closed if the customer moves to one side of the terminal 302 to allow a staff member to enter details at the terminal 302.

The application software 322 may require the staff member to provide identification, such as a password, or the staff member's face may be identified based on pre-stored templates, prior to allowing the staff member to continue with the customer's transaction.

It will now be appreciated that the above embodiment has the advantage that a customer who leaves an assisted terminal prior to completing a transaction will be logged out (that is, the session will be automatically closed), thereby protecting the security of the customer's information and reducing the possibility of a third party conducting a transaction using the customer's personal details.

Various modifications may be made to the above described embodiment within the scope of the invention, for example, in other embodiments, additional customer sensing devices may be used, such as pressure sensitive mats to detect whether the customer is still standing near the terminal, but not in front of the terminal.

In other embodiments, the sensing application 54 may be developed using library routines from the Open Source Computer Vision Library available from Intel Corporation (trademark) at the website http://www.intel.com/technology/computing/opencv/.

In other embodiments, the sensing application 54 may be developed using face tracking software available from the Computer Vision Laboratory of the Ecole Polytechnique Federale de Lausanne, (http://cvlab.epfl.ch/software/index.php).

In other embodiments, commercial face tracking software for use with webcams may be used, such as that provided by Logitech (www.logitech.com). Other machine vision face tracking solutions include those provided by A4Vision, 840 West California Ave, Suite 200, Sunnyvale, Calif. 94086, USA (http://www.a4vision.com/).

In the above embodiments, the customer absence criterion used was absence of a customer's face from the area in front of the terminal. In other embodiments, a different or additional customer absence criterion may be used; for example, the sensing application 54 may trigger an exception if a face other than the customer's face is detected in front of the terminal.

In other embodiments, alternative customer identification devices may be used. For example, an RFID reader may be used instead of a card reader.

In other embodiments, the sensing application may be used to identify the customer in addition to tracking the customer during a transaction. This would obviate the requirement for a card reader or any other customer identification device.

In some embodiments, the dip card reader may lock the customer's card during a transaction. This may occur if the customer's card is an integrated circuit card. In other embodiments, the card may be inserted and removed immediately, with the card details read from the card's magnetic stripe when the card is inserted and/or removed.

In other embodiments, the system 300 may be situated in locations other than a bank branch, for example, a retail outlet, a car rental office, a hotel, an airline check-in area, or the like.

In the embodiment of FIGS. 1 to 3B, the biometric sensor was used in verification mode (that is, there is a one-to-one comparison of created template to retrieved template); whereas, in the embodiment of FIGS. 4 and 5, the biometric sensor was used in identification mode (that is, there is a one-to-many comparison of created template to pre-stored templates). However, to accelerate identification, a customer may provide some details about himself/herself, such as address, name, age, or such like, even if those details are not unique to the customer. This would reduce the number of pre-stored templates that must be compared with the created template to locate a match (that is, there would be a one-to-few comparison).

In other embodiments, the SST 10 may be other than an ATM, for example, the SST may be an information kiosk, a postal services terminal, or such like.

In other embodiments where the SST is an ATM, the ATM may include devices additional and/or different to those described. For example, a touchscreen may be used instead of FDKs.

In other embodiments, the customer templates may not be pre-stored. A template may be created on-the-fly during a transaction, and used to track the customer for that transaction only. This would avoid the requirement to store templates, thereby saving storage space and avoiding privacy issues relating to storing personal information.

What is claimed is:

1. A self-service terminal comprising:
a self-service customer identification device;
a sensor including an image capture device configured to capture images of a customer present at the self-service terminal, wherein the sensor includes an array of weight sensors to detect a weight of the customer at the self-service terminal, the array of weight sensors incorporated into a mat on which the customer stands while at the self-service terminal; and a controller coupled to the customer identification device and the sensor, and being programmed to:
identify a customer based at least in part on customer identification received from the self-service customer identification device; create a session to conduct a self-service transaction on identification of a customer by the self-service customer identification device; retrieve a pre-stored template associated with the customer using the customer identification information; create a template for the customer using image data of the customer's face captured by the sensor; verify the identity of the customer by comparing the created template to the pre-stored template; track the customer's location during the session using image data of the customer's face continuously captured by the sensor where the identity of the customer is continuously verified using the captured image data of the customer; and close the created session when a customer absence criterion is fulfilled.

2. A self-service terminal according to claim 1, wherein the customer identification device comprises a media reader.

3. A self-service terminal according to claim 1, wherein the customer identification device and sensor are combined into an integral biometric sensor.

4. A self-service terminal according to claim 1, wherein the customer absence criterion comprises detecting, using image data, the presence of a person not identified as the verified customer.

5. A self-service terminal according to claim 1, wherein the customer absence criterion comprises a time period during which image data is used to determine the verified customer is not detected at the self-service terminal.

6. A self-service terminal according to claim 1, the customer absence criterion further comprises using image data to determine a condition where one or more people are detected closer to the self-service terminal than the verified customer.

7. A method of operating a self-service terminal, the method comprising: creating a session to conduct a self-service transaction for a customer at the self-service terminal; capturing image data of the customer; sensing at least one characteristic of the customer using the captured image data of the customer and the at least one characteristic sensed as a weight of the customer at the self-service terminal using an array of weight sensors incorporated into a mat on which the customer stands while at the self-service terminal; creating a template for the customer using the sensed characteristic or characteristics; determining the identity of the customer based at least in part on a comparison of the created template to at least one pre-stored template, each pre-stored template associated with a respective enrolled customer; tracking the identified customer during the session based at least in part on continuously capturing image data of the customer and re-identifying the customer; and closing the created session in the event that a customer absence criterion is fulfilled wherein failing to re-identify the customer fulfills the customer absence criterion.

8. A computer implemented method in an assisted terminal system comprising a network of assisted terminals coupled to a supervisory terminal, where the supervisory terminal enables an operator to monitor customer activity at the assisted terminals, the method comprising:
identifying a customer using information from a self-service customer identification device at one of the assisted terminals;
creating a session for the identified customer at the assisted terminal; entering session monitoring mode for that session, where session monitoring mode includes repeatedly sensing at least one characteristic of the identified customer using captured image data of the identified customer's face and the at least one characteristic sensed as a weight of the customer at the assisted terminal using an array of weight sensors incorporated into a mat on which the customer stands while at the assisted terminal, creating a template for the identified customer using the sensed characteristic or characteristics to allow the assisted terminal to further identify the identified customer using the sensed characteristic or characteristics and then discriminate between the identified customer and other people who may be in the vicinity of the assisted terminal, and closing the created session in the event that a customer absence criterion is fulfilled wherein fulfilling the customer absence criterion includes determining other people are in the vicinity of the assisted terminal; and exiting session monitoring mode in the event that the identified customer requests, via the assisted terminal, assistance from an operator of the supervisory terminal.

9. A method according to claim 8, wherein the method comprises the further step of authorizing the operator prior to allowing the operator to provide assistance to the identified customer at the assisted terminal.

10. A method according to claim 8, wherein the method comprises the further step of re-entering session monitoring mode after the operator has completed providing assistance to the identified customer.

11. A self-service terminal comprising:
a sensing device including an image capture device configured to capture images of a customer present at the self-service terminal and the image capture device includes a thermal imager and an array of weight sensors incorporated into a mat on which the customer stands while at the self-service terminal to capture a weight of the customer; a controller coupled to the sensing device, and programmed to create a template associated with the customer using image data and weight captured by the sensing device; and the controller being operable to create a session for conducting a self-service transaction for the customer, periodically determine the identity of the customer based at least in part on a comparison of a newly created template using newly captured image data to at least one pre-stored template, each pre-stored template associated with a respective enrolled customer; and to close the created session when a customer absence criterion is fulfilled wherein the customer absence criterion is fulfilled when during the session the customer cannot be identified.

12. A self-service terminal according to claim 11, wherein the sensing device comprises a facial tracking and recognition device that tracks a customer's face during a transaction and identifies the customer based on characteristics of the customer's face.

13. A self-service terminal according to claim 1 wherein the controller executes a sensing application to process output from the sensor to provide both face finding to find a face in an image from the sensor and face recognition to compare the face in the image with a pre-processed facial template.

14. A self-service terminal according to claim 13 wherein the sensing application computes a match score indicating a likelihood the face in the image is that of the same person as the pre-processed facial template.

15. A self-service terminal according to claim 1 wherein the self-service terminal is an automated teller machine (ATM) and the self-service transaction is dispensing cash, and the self-service customer identification device is a card reader to read customer identification data from a customer's card.

16. A self-service terminal according to claim 15 wherein the controller is programmed to initiate the capturing of image data by the sensor by providing the customer identification data from the customer's card.

17. A self-service terminal according to claim 16 wherein the controller utilizes the customer identification data to access a pre-stored template associated with the customer.

18. A self-service terminal according to claim 1 wherein creating a template associated with the customer further comprises creating a template of the customer's face from the image obtained by the sensor.

19. A self-service terminal according to claim 17 wherein determining the identity of the customer based at least in part on a comparison of the template to at least one pre-stored template further comprises comparing the template with the pre-stored template associated with the customer to determine if there is a match that identifies the customer.

* * * * *